US005381999A

United States Patent [19]

Ricco

[11] Patent Number: 5,381,999

[45] Date of Patent: Jan. 17, 1995

[54] DEVICE FOR ADJUSTING A FUEL INJECTOR ELECTROMAGNETIC METERING VALVE

[75] Inventor: Mario Ricco, Via Ferrannini, Italy

[73] Assignee: Elasis Sistema Ricerca Fiat Nel Mezzogiorno, Pomigliano D'arco, Italy

[21] Appl. No.: 173,991

[22] Filed: Dec. 28, 1993

[30] Foreign Application Priority Data

Dec. 29, 1992 [IT] Italy .......................... TO92A001051

[51] Int. Cl.[6] .............................................. F16K 31/06

[52] U.S. Cl. .......................... 251/129.16; 251/129.18; 239/585.3

[58] Field of Search ...................... 251/129.16, 129.18; 239/585.3

[56] References Cited

U.S. PATENT DOCUMENTS 4,176,624 12/1979 Bielecki et al. .
4,662,567 5/1987 Knapp ........................ 251/129.18 X
4,715,332 12/1987 Kreuter ...................... 251/129.18 X
4,905,907 3/1990 Ricco ......................... 251/129.16 X
5,085,402 2/1992 O'Dell ........................ 251/129.16 X

FOREIGN PATENT DOCUMENTS 318178 5/1989 European Pat. Off. .
483769 5/1992 European Pat. Off. .
2187332 9/1987 United Kingdom .

*Primary Examiner*—Arnold Rosenthal
*Attorney, Agent, or Firm*—Ladas & Parry

[57] ABSTRACT

The valve comprises a shutter for the drain conduit of the control chamber of the injector; and an electromagnet having a fixed core, and an armature controlling the shutter and which is normally pushed by a return spring for maintaining the drain conduit closed by the shutter. The device for adjusting the travel of the armature comprises a plate which is fitted to the body of the injector by means of a sleeve and via the interposition of two sets of calibrated washers. The plate presents a stop element against which is arrested a contact element integral with the armature, for preventing the armature from contacting the core.

14 Claims, 2 Drawing Sheets

DEVICE FOR ADJUSTING A FUEL INJECTOR ELECTROMAGNETIC METERING VALVE

BACKGROUND OF THE INVENTION

The present invention relates to a device for adjusting a fuel injector electromagnetic metering valve.

The metering valves of fuel injectors generally comprise a control chamber with a drain conduit normally closed by a shutter which, in known metering valves, is normally closed by the armature of an electromagnet, and is released to open the conduit by energizing the electromagnet so as to move the armature towards the core of the magnetic circuit of the electromagnet.

As is known, the main parameter for evaluating the efficiency of a metering valve is the maximum permissible operating frequency, which depends on the speed with which the valve responds to a command to open or close the drain conduit, and hence on the speed with which it responds to energizing or de-energizing of the electromagnet.

In known metering valves, when the electromagnet is energized, the armature is generally arrested directly on the core; and, when the electromagnet is de-energized, the armature, due to the residual magnetic field, tends to stick to the core so that, to ensure rapid response when closing the injector, a large size return spring is required, the force of which however must be overcome by the electromagnet when opening the valve.

In some known metering valves, the pole pieces of the core present a layer of nonmagnetic material for achieving a minimum gap between the core and armature and reducing the effect of the residual magnetic field of the core on the armature. In such valves, however, repeated impact of the armature on the protective coating of the core, which is made of sintered material, seriously reduces the working life of the protective layer and/or the core; while no provision is made for adjusting the gap.

Other known metering valves comprise a device for adjusting the stop position of the armature, and in turn comprising an adjusting screw housed in a threaded sleeve at the base of the injector body, and which provides for positioning an axial stop for a pin integral with the armature. This device, too, presents several drawbacks, in that it fails to provide for setting a predetermined displacement of the armature; and the adjusting screw, despite being fitted with a lock nut, tends to work loose, thus possibly resulting in the armature contacting the core.

SUMMARY OF THE INVENTION

It is an object of the present invention to provide a straightforward, highly reliable device for adjusting a metering valve of the aforementioned type, and designed to overcome the aforementioned drawbacks typically associated with known devices.

According to the present invention, there is provided a device for adjusting a fuel injector electromagnetic metering valve comprising a shutter for the drain conduit of the control chamber of the injector, and an electromagnet having a fixed core and an armature for controlling said shutter; said armature normally being pushed elastically so that said conduit is maintained closed by said shutter; and said device being characterized by the fact that it comprises calibrated means for defining the travel of said armature and preventing said armature from contacting said core.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
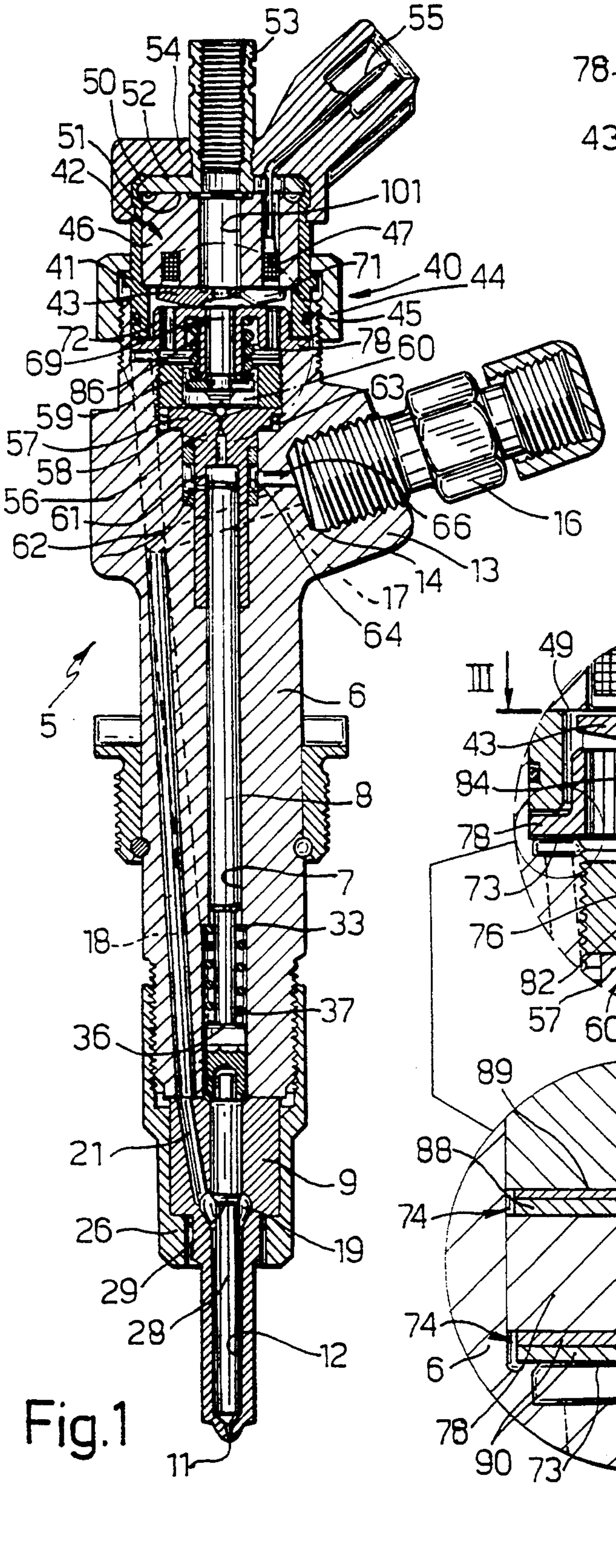
FIG. 1 shows a half section of a fuel injector featuring a metering valve adjusting device in accordance with a first embodiment of the present invention.

Number 5 in FIG. 1 indicates a fuel injector, e.g. for a Diesel internal combustion engine.

Injector 5 comprises a hollow body 6 having an axial cavity 7 in which slides a control rod 8. At the bottom, body 6 is connected to a nozzle 9 terminating with one or more injection orifices 11 communicating with an axial cavity 12.

Body 6 presents an appendix 13 having a hole 14 in which is inserted an inlet fitting 16 connected in known manner to a normal high-pressure, e.g. 1200 bar, fuel supply pump. Hole 14 communicates with a first inclined conduit 17 in turn communicating with a second conduit 18 substantially extending along body 6.

Nozzle 9 presents an injection chamber 19 communicating with cavity 12, and a conduit 21 communicating with chamber 19, and is fitted on to body 6 by means of a ring nut 26. Orifice 11 is normally closed by the tip of a pin 28 connected to rod 8 and having a shoulder 29 on which the pressurized fuel in chamber 19 acts. A compression spring 37 is fitted between a shoulder 33 of cavity 7 and a plate 36, and which contributes towards pushing rod 8 downwards.

Injector 5 also comprises a metering valve 40 in turn comprising a sleeve 41 for supporting an electromagnet 42 controlling an armature 43. Sleeve 41 is fitted to body 6 by means of a further ring nut 44, and presents a shoulder 45 on which the core 46 of electromagnet 42 rests.

Core 46 is made of ferromagnetic material, e.g. sintered powder, and houses a normal electric coil 47. The magnetic circuit of core 46 presents two annular, concentric, coplanar pole surfaces 48, 49 (FIG. 2), and armature 43 is disk-shaped so as to close the magnetic circuit.

Sleeve 41 (FIG. 1) also presents a bent edge 50 which provides for securing a disk 52 against a further flat surface 51 of core 46. Disk 52 forms one piece with a drain fitting 53 aligned with an axial hole 101 in core 46 and connected to the fuel tank; and sleeve 41 is fitted in known manner with a base 54 made of insulating material and fitted as usual with the pin 55 of coil 47.

Metering valve 40 also comprises a head 56 housed inside a seat in body 6, coaxial with cavity 7, and which in turn comprises a flange 57 normally held against a shoulder 58 of body 6 by a threaded ring nut 59. Ring nut 59 is screwed on to the internal thread of a drain chamber 60 inside body 6 and extending axially between the upper surface of head 56 and the lower surface 48, 49 of core 46.

Head 56 also presents an axial control chamber 61 communicating with a calibrated radial inlet conduit 62, and with a calibrated axial drain conduit 63. Inlet conduit 62 communicates with a receiving chamber 64 in turn communicating with hole 14 via a radial conduit 66 in body 6. Control chamber 61 is defined at the bottom by the upper surface of rod 8.

By virtue of the larger area of the upper surface of rod 8 as compared with that of shoulder 29, the pressure of the fuel together with spring 37, normally keeps rod 8 in such a position as to close orifice 11 of nozzle 9. Drain conduit 63 of control chamber 61 is normally closed by a shutter in the form of a ball 67 (FIG. 2) guided by a plate 68 en which shank 69 of armature 43 acts; and armature 43 presents radial openings 71 for connecting drain chamber 60 to axial hole 101 in core 46 and consequently to drain fitting 53.

According to the present invention, metering valve 40 presents an adjusting device comprising calibrated means for defining the travel of armature 43 and preventing it from contacting core 46. Said means include a plate-shaped member 72 fitted between a shoulder 73 of body 6 and sleeve 41 via the interposition of a group of calibrated washers 74, and in turn including a stop element 76 for a contact member 77 fitted to shank 69 of armature 43.

Figure 3:
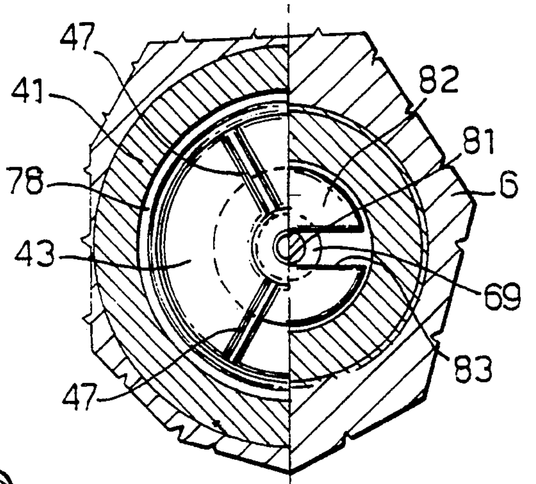
FIG. 3 shows a section along line III—III in FIG. 2.
Figure 2:
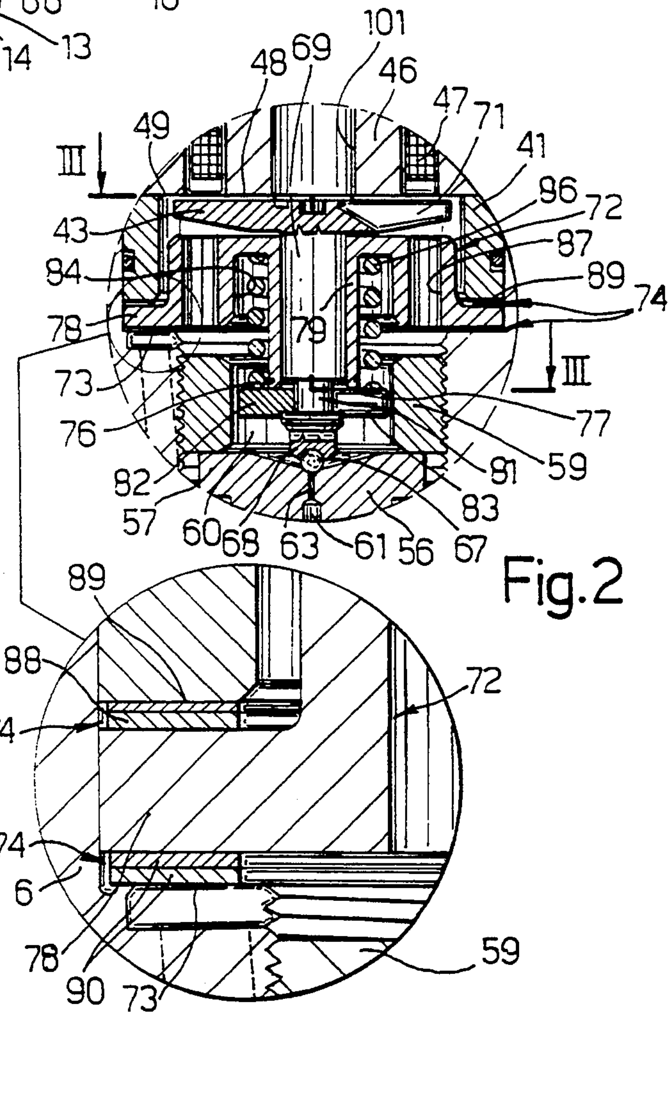
FIG. 2 shows a larger-scale section of a detail in FIG. 1.

According to the embodiment shown in FIGS. 1–3, plate 72 comprises an assembly flange 78, and a central sleeve 79 for guiding shank 69 which forms one piece with armature 43 and presents a groove 81 housing a C-shaped washer 82. Washer 82 in fact presents a radial opening 83 (FIG. 3) for enabling it to be fitted on to shank 69, and the upper surface of washer 82 forms the contact member 77 (FIG. 2) of shank 69 which is arrested against the bottom annular edge of sleeve 79, which forms stop element 76.

Sleeve 79 also forms a seat 84 for a helical compression spring 86 which provides for recalling armature 43 and is located between the bottom of plate 72 and washer 82. By means of shank 69 and plate 68, spring 86 normally keeps ball 67 so positioned as to close drain conduit 63; and plate 72 presents holes 87 for enabling communication between the portions of drain chamber 60 above and below plate 72.

Said group of washers 74 comprises one or more upper calibrated washers 88 between flange 78 and the bottom annular edge 89 of sleeve 41; and one or more lower calibrated washers 90 located between flange 78 and shoulder 73, and which are so selected that the total thickness corresponds with the required travel setting of armature 43 and, hence, the required opening of drain conduit 63 upon operation of electromagnet 42.

Similarly, upper washers 88 are so selected that the total thickness corresponds with the required stop setting of armature 43 upon operation of electromagnet 42, which stop setting must be such as to leave a minimum gap between armature 43 and pole surfaces 48 and 49 of core 46, as shown in FIG. 2.

Armature 43 and plate 72 are assembled by first preparing the assembly consisting of sleeve 41, core 46 of electromagnet 42, disk 52 and base 54; shank 69 is then inserted inside sleeve 79 of plate 72, and spring 86 into seat 84; and, by preloading spring 86, C-shaped washer 86 is inserted inside groove 81 of shank 69.

After selecting the lower calibrated washers 90, these are fitted on to shoulder 73 of body 6; flange 78 of plate 72 is fitted on to washers 90; upper calibrated washers 88 are selected and fitted on to flange 78; the sleeve 41 assembly is fitted with edge 89 against washers 88; and, by means of ring nut 44, the sleeve 41 assembly, complete with core 46, disk 52 and base 54, is fitted on to body 6.

Figure 4:
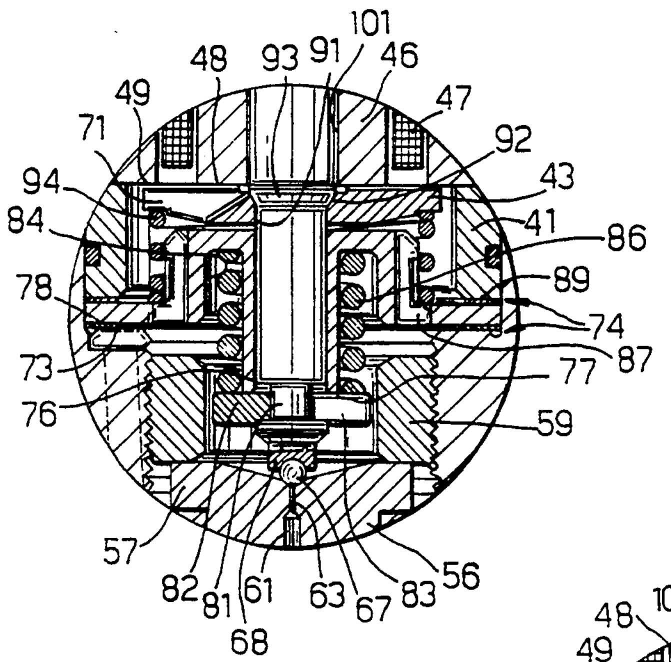
FIG. 4 shows the same section as in FIG. 2 of a variation of the present invention.

According to the FIG. 4 variation, shank 69 is separate from armature 43, and may be made of nonmagnetic and hence cheaper material as compared with armature 43, which presents a hole 91 terminating at the top with a flared portion 92. Shank 69 is inserted in sliding manner inside hole 91, and presents a top shoulder 93 with a conical surface complementary to that of portion 92. A second spring 94 is inserted between flange 78 and armature 43, for keeping armature 43 with the flared portion 92 of hole 91 against shoulder 93 of shank 69.

Metering valve 40 in FIG. 4 is assembled by first inserting shank 69 inside hole 91 and fitting spring 94 on to flange 78 and about the body of plate 72; shank 69 is then inserted inside sleeve 79, after which the same procedure described above is followed as regards assembly of spring 86 and C-shaped washer 82, and selection, assembly and clamping of calibrated washers 88 and 90.

Figure 5:
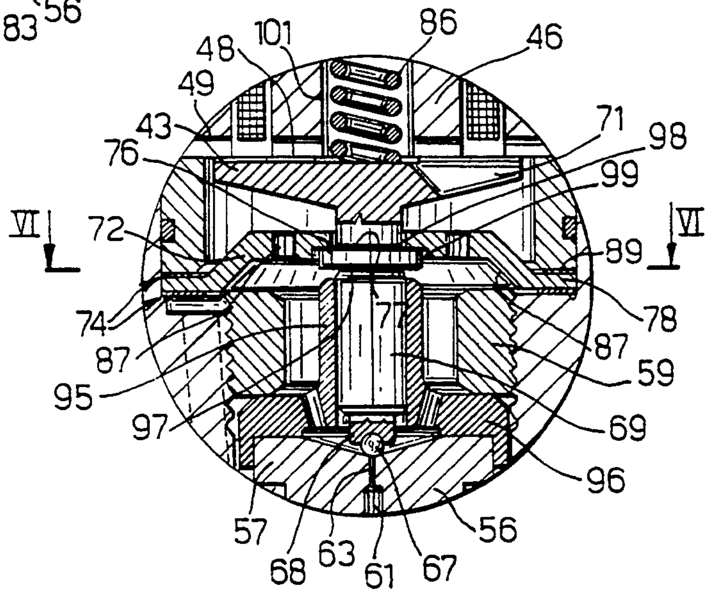
FIG. 5 shows the same section as in FIG. 2 of a further variation of the present invention.
Figure 6:
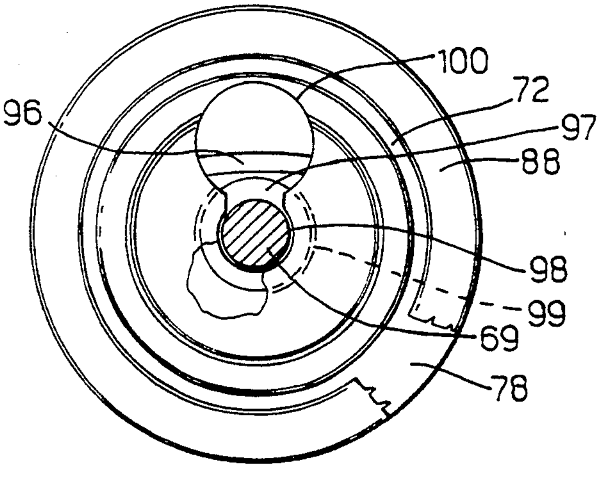
FIG. 6 shows a section along line VI—VI in FIG. 5.

According to the variation shown in FIGS. 5 and 6, shank 69 forms one piece with armature 43 and is guided by a sleeve 95 of a bell-shaped member 96 which is fitted axially on to body 6 by means of ring nut 59 for axially and radially locking head 56. Shank 69 also forms one piece with a flange 97, the upper surface of which forms contact member 77.

Plate 72 presents a central hole 98, the edge of which presents a depression 99 at the bottom. The flat surface of depression 99 forms the stop element 76 for surface 77. Hole 98 (FIG. 6) presents a slotted portion connecting it to an eccentric hole 100 for enabling insertion of member 96. Armature 43 is normally kept in the down position by return spring 86 located inside axial hole 101 of core 46, between the upper surface of armature 43 and a shoulder (not shown).

Metering valve 40 in FIGS. 5 and 6 is assembled by first inserting shank 69 inside eccentric hole 100 and moving it along the slot so as to center it in hole 98; flange 78 of plate 72 is then fitted between washers 88 and 90 as described previously; spring 86 is inserted inside hole 101; and the resulting assembly is locked on to sleeve 41 by means of ring nut 44.

Operation of the injector as described above is as follows.

Electromagnet 42 is normally de-energized, so that armature 43 is held by return spring 86 in the down position in the accompanying drawings; shank 69 keeps ball 67 in the position closing drain conduit 63; and the pressure generated in control chamber 61 acts on the upper surface of rod 8 having a greater surface area than shoulder 29, and, together with the action of spring 37 (FIG. 1), overcomes the pressure on shoulder 29 so that rod 8 is held down together with pin 28 which closes orifice 11.

When electromagnet 42 is energized, armature 43 is raised by the amount defined by washers 90 (FIGS. 2–6); and shank 69 releases ball 67 and is arrested with contact surface 77 on stop element 76 of plate 72, thus preventing armature 43 from contacting pole surfaces 48 and 49 of core 46.

The residual pressure of the fuel in chamber 61, together with the action of spring 37, therefore opens metering valve 40 so as to discharge the fuel through calibrated hole 63 and holes 87 into drain chamber 60 and back into the tank. The pressure of the fuel inside injection chamber 19 (FIG. 1) now overcomes the residual pressure on the upper surface of rod 8, assisted by spring 37, and so raises pin 28 which opens orifice 11 so as to inject the fuel inside chamber 19.

When electromagnet 42 de-energized, armature 43, by virtue of the gap remaining in relation to core 46, is brought rapidly back to the down position by spring 86; armature 43 restores ball 67 to the position closing drain conduit 63; the pressurized incoming fuel from conduit 62 restores the pressure inside control chamber 61; and pin 28 moves back down to close orifice 11.

The advantages of the metering valve adjusting device according to the present invention will be clear from the foregoing description.

In particular, it provides for adjusting the stop position of armature 43 and so preventing it from contacting the core; for setting and adjusting the travel of armature 43, i.e. maximum opening of drain conduit 63; and, finally, for preventing any possibility of the adjusting screw working loose, and hence of armature 43 eventually contacting core 46.

To those skilled in the art it will be clear that changes may be made to the device as described and illustrated herein without, however, departing from the scope of the present invention. For example, plate 72 may be designed differently from that described; return spring 86 may be located differently; and shank 69 in FIG. 5 may be separate from armature 43 as in FIG. 4.

I claim:

1. A device for adjusting an electromagnetic metering valve of an injector including a body (6), said metering valve comprising a control chamber (61), a shutter (67) for a drain conduit (63) of said control chamber (61), an electromagnet (42) having a fixed core (46) for operating an armature (43) controlling said shutter (67) and calibrated means (72, 74) for defining operational travel of said armature (43) and comprising a contact surface (77) on said armature (43) arrested by an annular stop element (76) upon energizing said electromagnet (42) to prevent said armature (43) from contacting said core (46), at least a first calibrated washer (88) for defining the position of said stop element (76) and at least a second calibrated washer (90) for defining the travel of said armature (43), said first and second calibrated washers (88, 90) being fitted so as to locate said stop element (76) on said body (6).

2. A device as claimed in claim 1, wherein said annular element (76) is integral with a flange (78); fastening means (41, 44) being provided for fitting said calibrated means (72, 74) and said flange (78) to said body (6), said first calibrated washer (88) being fitted between said flange (78) and a first shoulder (89) provided on said fastening means (41, 44) and said second calibrated washer (90) being fitted between said flange (78) and a second shoulder (73) provided on said body (6).

3. A device for adjusting a fuel injector electromagnetic metering valve comprising a shutter (67) for a drain conduit (63) of a control chamber (61) of an injector, an electromagnet (42) having a fixed core (46) and an armature (43) for controlling said shutter (67), said armature (43) being normally pushed elastically so that said conduit (63) is maintained closed by said shutter (67) and calibrated means (72, 74) for defining travel of said armature (42), said calibrated means (72, 74) comprising a contact surface (77) provided on a sleeve (79) to be arrested by an annular stop element (76) upon energizing said electromagnet (42) to prevent said armature (43) from contacting said core (46), fastening means (41,44) for fitting said calibrated means (72, 74) to a body (6) of the injector, at least a first calibrated washer (88) for defining the position of said stop element member (76), and at least a second calibrated washer (90) for defining the travel of said armature (43), said first calibrated washer (88) being fitted between a flange (78) integral with said stop element member (76) and a first shoulder (89) provided on said fastening means (41, 44) and said second calibrated washer (90) being fitted between said flange (78) and a second shoulder (73) provided on said body (6).

4. A device as claimed in claim 3, wherein said fastening means (41, 44) comprise a member (41) for assembling said core (46), and a ring (44) for locking said member (41) on to said body (6); said member (41) presenting said first shoulder (89) for gripping said flange (78) between said calibrated washers (88, 90).

5. A device as claimed in claim 3, wherein flange (78) is presented by a plate-shaped member (72) having a central sleeve (79); said stop element (76) being formed by an edge of said sleeve (79).

6. A device as claimed in claim 5, wherein said armature (43) is disk-shaped, said sleeve (79) also provides for guiding a shank (69) of said armature (43), and said shank (69) provides for operating said shutter (67).

7. A device as claimed in claim 6, characterized by the fact that said contact member (77) consists of a contact washer (82) integral with said shank (69); said plate-shaped member (72) comprising a seat (84) for a compression spring (86) acting on said contact washer (82), for maintaining said conduit (63) closed by said shutter (67).

8. A device as claimed in claim 7, characterized by the fact that said contact washer (82) presents a radial opening (83) enabling it to be fitted in a groove (81) on said shank (69).

9. A device as claimed in claim 6, characterized by the fact that said shank (69) forms one piece with said armature (43).

10. A device as claimed in claim 8, characterized by the fact that said shank (69) is fitted in sliding manner inside a hole (91) in said armature (43), and presents a further shoulder (93) for arresting mutual displacement between said shank (69) and said armature (43) in one direction.

11. A device as claimed in claim 10, characterized by the fact that a further compression spring (94) is inserted between said plate-shaped member (72) and said armature (43), for elastically maintaining said armature (43) against said further shoulder (93).

12. A device as claimed in claim 5, wherein plate-shaped member (72) presents a central hole (98); said stop element (76) being formed by an edge adjacent to said central hole (98).

13. A device as claimed in claim 12, wherein said armature (43) is disk-shaped, characterized by the fact that said armature (43) forms one piece with a shank (69) guided by a sleeve (95) integral with said body (6).

14. A device as claimed in claim 13, characterized by the fact that said contact member (77) consists of an annular flange (97) forming one piece with said shank (69).

* * * * *